US005793029A

United States Patent [19]

Goodwin, III

[11] Patent Number: 5,793,029
[45] Date of Patent: Aug. 11, 1998

[54] ELECTRONIC PRICE LABEL HAVING TWO DIMENSIONAL BAR CODE READER

[75] Inventor: John C. Goodwin, III, Suwanee, Ga.

[73] Assignee: NCR Corporation, Dayton, Ohio

[21] Appl. No.: 887,411

[22] Filed: Jul. 2, 1997

Related U.S. Application Data

[63] Continuation of Ser. No. 531,809, Sep. 21, 1995, abandoned.
[51] Int. Cl.$^6$ ................................................. G06K 7/10
[52] U.S. Cl. ........................ 235/483; 235/475; 235/462
[58] Field of Search ................................ 235/383, 375, 235/462

[56] References Cited

U.S. PATENT DOCUMENTS

| | | | |
|---|---|---|---|
| 4,002,886 | 1/1977 | Sundelin | 235/383 |
| 4,825,058 | 4/1989 | Poland | 235/383 |
| 5,111,196 | 5/1992 | Hunt | 235/383 |
| 5,172,314 | 12/1992 | Poland et al. | 235/383 |
| 5,448,226 | 9/1995 | Failing, Jr. et al. | 235/383 |
| 5,504,322 | 4/1996 | Pavlidis et al. | 235/494 |
| 5,504,475 | 4/1996 | Houdou et al. | 340/825.35 |

FOREIGN PATENT DOCUMENTS

WO9423381  10/1994  WIPO.

*Primary Examiner*—Donald T. Hajec
*Assistant Examiner*—Mark Tremblay
*Attorney, Agent, or Firm*—Paul W. Martin; Peter H. Priest

[57] ABSTRACT

An EPL having a two-dimensional (2-D) bar code reader which reads a two-dimensional bar code label on a back side of an overlay. The two-dimensional bar code label is situated adjacent the two-dimensional bar code reader when the overlay is installed. The two-dimensional bar code label may contain data for the item associated with the electronic price label or programming instructions for controlling the electronic price label. The two-dimensional bar code reader is activated by a switch only when necessary to read a new two-dimensional bar code label. The switch may be activated manually or remotely by a computer coupled to the electronic price label.

12 Claims, 3 Drawing Sheets

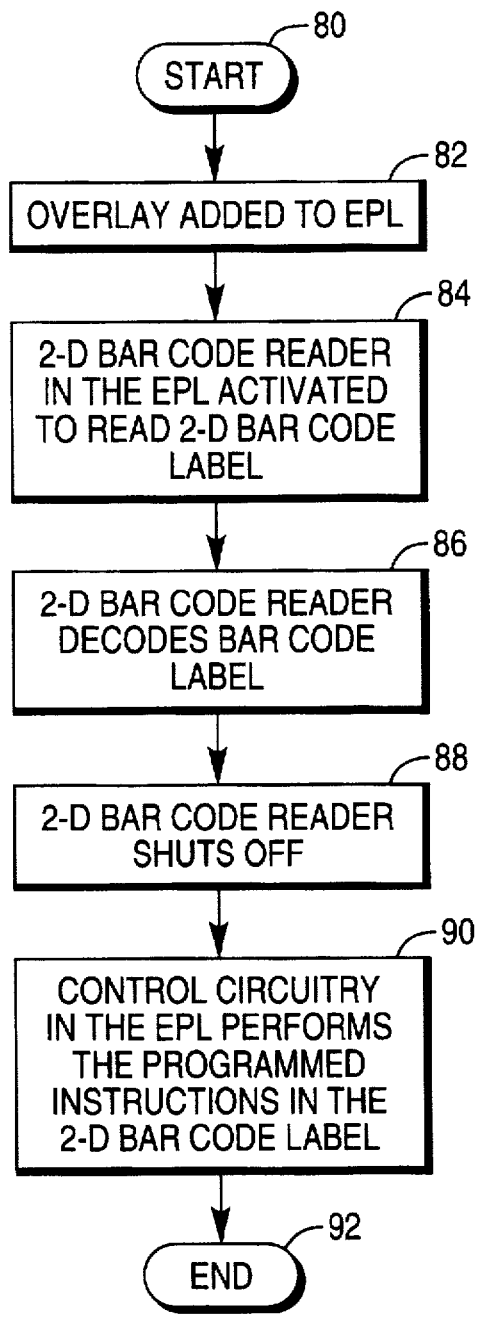

ELECTRONIC PRICE LABEL HAVING TWO DIMENSIONAL BAR CODE READER

This is a continuation of copending application Ser. No. 08/531,809 filed Sep. 21, 1995 now abandoned.

BACKGROUND OF THE INVENTION

The present invention relates to electronic price label (EPL) systems, and more specifically to an EPL having a two-dimensional (2-D) bar code reader.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information, EPL merchandise item information, and price verifier information, such as, a checksum value. Price information is typically displayed by the EPLs and is obtained from the PLU file.

International Application No. PCT/SE94/00298, published under the Patent Cooperation Treaty on Oct. 13, 1994, discloses an EPL having a bar code reader for reading a one-dimensional bar code label on the back side of a special tag applied to the EPL. When the bar code reader reads the bar code label, the EPL changes its address to the value of the bar code label and looks for a price-change message from the central EPL system controller that is associated with the new assignment. This publication is hereby incorporated by reference.

A one-dimensional bar code label is limited in the information that it contains and is therefore of limited use in connection with EPLS. Therefore, it would be desirable to provide an EPL having a two-dimensional (2-D) bar code reader.

SUMMARY OF THE INVENTION

In accordance with the teachings of the present invention, an EPL having a two-dimensional (2-D) bar code reader is provided. The two-dimensional (2-D) bar code reader reads a two-dimensional bar code label on a back side of an overlay. The two-dimensional bar code label is situated adjacent the two-dimensional bar code reader when the overlay is installed. The two-dimensional bar code label may contain data for the item associated with the electronic price label or programming instructions for controlling the electronic price label. The two-dimensional bar code reader is activated by a switch only when necessary to read the two-dimensional bar code label. The switch may be activated manually or remotely by a computer coupled to the electronic price label.

A method for programming an electronic price label is also disclosed. The method includes the steps of providing the electronic price label with a two-dimensional bar code reader; providing an overlay for the electronic price label having front and rear sides, wherein the rear side has a two-dimensional bar code label containing programming instructions; situating the overlay on the electronic price label such that the two-dimensional bar code label is adjacent the two-dimensional bar code reader; activating the two-dimensional bar code reader by a computer coupled to the electronic price label to cause it to scan the two-dimensional bar code label; and implementing the programming instructions by the electronic price label.

It is accordingly an object of the present invention to provide an EPL having a two-dimensional (2-D) bar code reader.

It is another object of the present invention to provide an EPL having a two-dimensional (2-D) bar code reader which reads a two-dimensional bar code label on the back side of an overlay.

It is another object of the present invention to provide an EPL having a two-dimensional (2-D) bar code reader which is selectively activated to read a two-dimensional bar code label on the back side of an overlay.

It is another object of the present invention to provide an EPL having a two-dimensional (2-D) bar code reader which is programmed by instructions contained within a two-dimensional bar code label on the back side of an overlay.

It is another object of the present invention to provide an EPL having a two-dimensional (2-D) bar code reader which reads item data contained within a two-dimensional bar code label on the back side of an overlay.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 5 is a flow diagram illustrating the operation of the EPL and its bar code reader.

DETAILED DESCRIPTION OF THE PREFERRED EMBODIMENT

Figure 1:
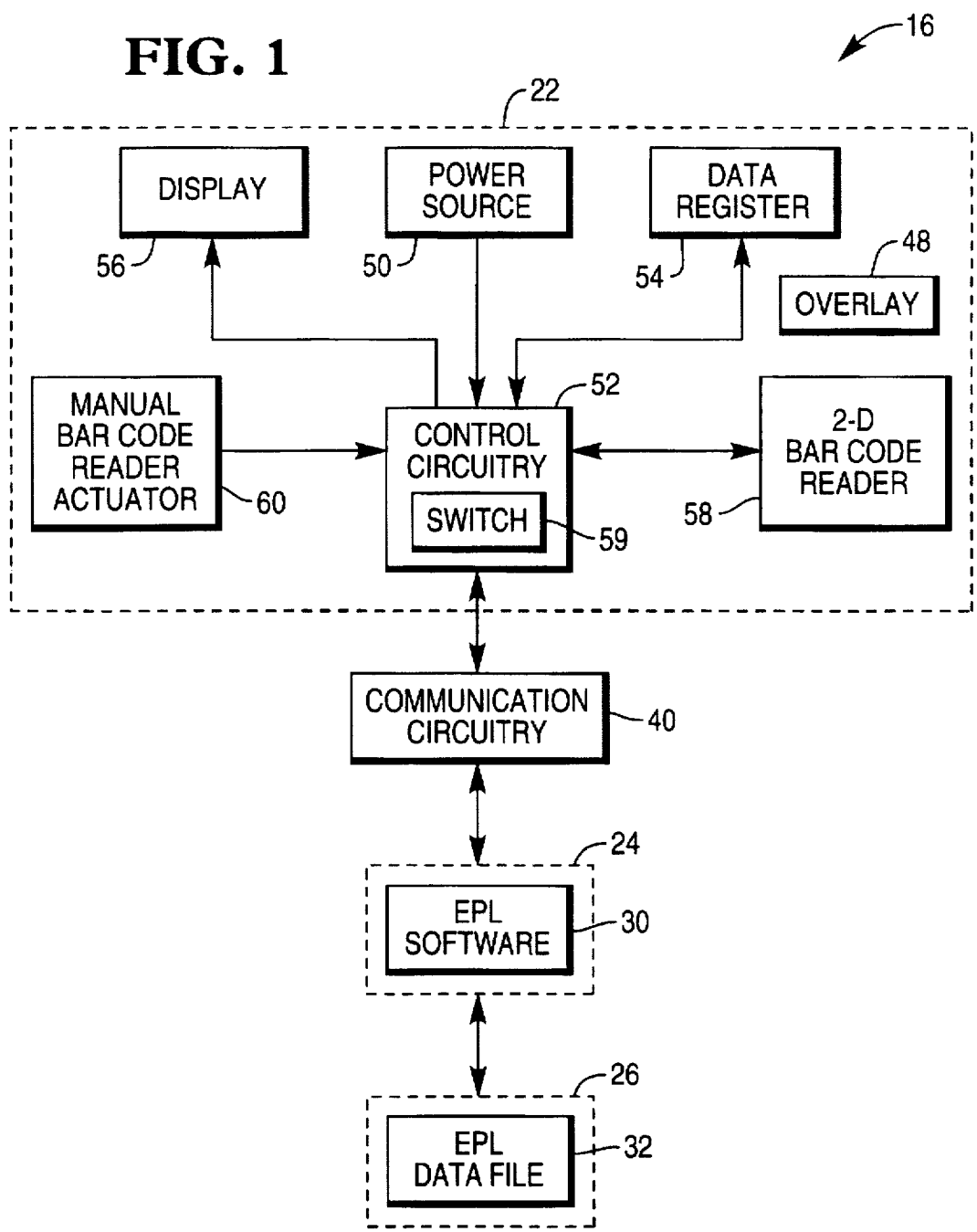
FIG. 1 is a block diagram of an EPL system.

Referring now to FIG. 1, EPL system 16 primarily includes EPL 22, host EPL terminal 24, EPL storage medium 26, and communication circuitry 40.

EPL 22 is typically attached to a shelf within a store and includes overlay 48, power source 50, control circuitry 52, a data register 54, a display 56, 2-D bar code reader 58, and optional manual bar code reader actuator 60. System 16 includes a plurality of such EPLs.

Overlay 48 displays information not displayed by display 56 and includes a 2-D bar code label on its rear side for programming EPL 22.

Power source 50 is preferably coupled to an alternating current source, but may also include a battery.

Data register 54 contains stored data, usually the price of an item associated with EPL 22 and other internal parameters specific to each EPL. Price data is typically displayed by display 56. Other data may be displayed on command for diagnostic purposes. 2-D bar code reader 58 is preferably any 2-D bar code reader known in the art.

Manual bar code reader actuator 60 turns 2-D bar code reader 58 on when actuated by a store operator. Manual bar code reader actuator 60 engages switch 59. 2-D bar code reader 58 is preferably off until manually or electronically activated.

Host EPL terminal 24 executes EPL software 30, which maintains the contents of EPL data file 32.

EPL storage medium 26 stores EPL data file 32 and is preferably a fixed disk drive. EPL data file 32 includes a line entry for each EPL 22 in EPL system 16. Each line entry has an item identification entry, an EPL identification entry, and an EPL price checksum value entry.

The item identification entry identifies a store item. The EPL identification entry identifies a serial number for an EPL which is assigned to the item. The EPL price checksum value entry is a checksum value of the digits of the price information that is displayed by display 56.

Communication circuitry 40 transmits and receives messages between terminal 24 and EPL 22. Communication may be wired, wireless, or a combination of wired and wireless. One such message is a message that activates 2-D bar code reader 58 through switch 59.

Figure 2:
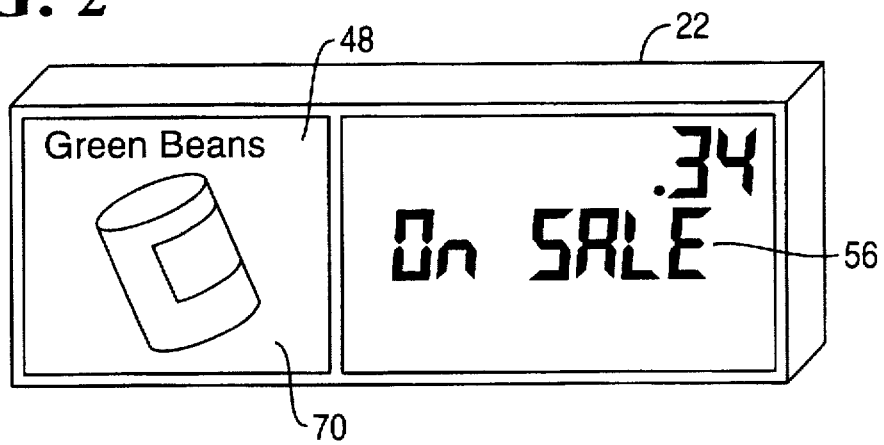
FIG. 2 is a perspective view of an assembled EPL of the present invention.
Figure 3:
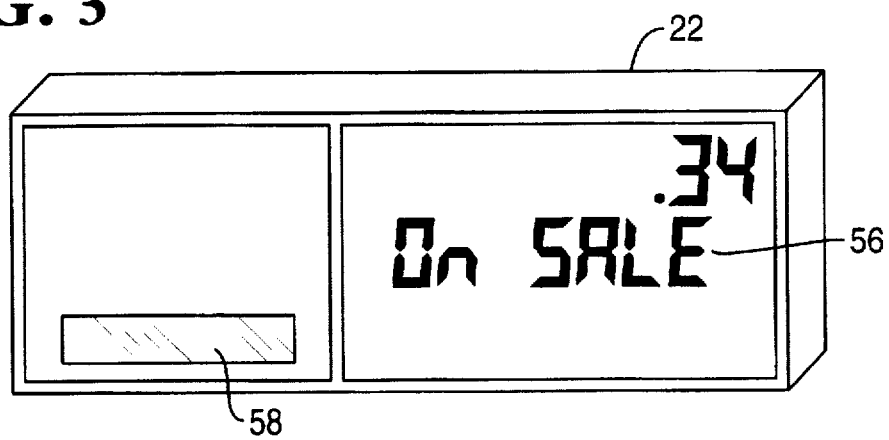
FIG. 3 is a perspective view of an EPL without an attached overlay.
Figure 4:
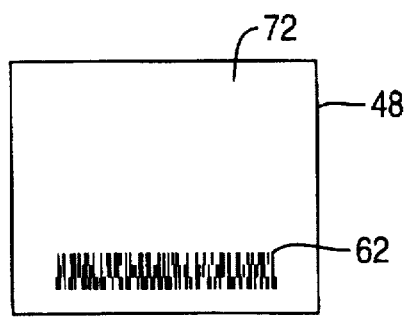
FIG. 4 is a back view of an overlay showing a 2-D bar code label.

Turning now to FIGS. 2–4, EPL 22 is shown in more detail. Overlay 48 includes a picture of a product on a front side 70. Overlay 48 has a 2-D bar code label 62 on its back side 72 (FIG. 4), and may be retained in EPL 22 by an adhesive applied to side 72 or by retaining tabs on EPL 22. 2-D bar code label 62 is aligned over 2-D bar code reader 58 when overlay 48 is installed. Here, 2-D bar code label contains identification information about the item, and a programming instruction that causes EPL 22 to display the promotional message "On Sale".

Other uses for 2-D bar code labels are also envisioned by the present invention. In addition to item identification information, the 2-D bar code label may convey the item's unit of measurement for a unit price calculation by EPL 22, scheduling instructions for displaying promotional messages, product update messages, commands to perform internal diagnostic procedures, a command to display all segments or a test pattern sequence in order to facilitate a visual check of display 56, and a command to display internal factory and store assigned information stored within the EPL.

Turning now to FIG. 5, the operation of EPL 22 and bar code reader 58 is illustrated in more detail beginning with START 80.

In step 82, overlay 48 is added to EPL 22, either by an overlay application machine, or by hand.

In step 84, 2-D bar code reader 58 in EPL 22 is activated to read 2-D bar code label 62.

In step 86, 2-D bar code reader 58 decodes 2-D bar code label 62.

In step 88, 2-D bar code reader 58 shuts off.

In step 90, control circuitry 52 in EPL 22 reads the data within 2-D bar code label 62 and performs the programmed instructions in 2-D bar code label 62 and the method ends in step 92.

Although the present invention has been described with particular reference to certain preferred embodiments thereof, variations and modifications of the present invention can be effected within the spirit and scope of the following claims.

What is claimed is:

1. An electronic price label system comprising:

a plurality of electronic price labels, at least a portion of said plurality electronic price labels including
a display;
a two-dimensional bar code reader;
an overlay having front and rear sides, wherein the rear side has a two-dimensional bar code label situated adjacent the two-dimensional bar code reader, wherein the two-dimensional bar code label includes first information identifying an item associated with the electronic price label and second information including first commands for controlling the display; and control circuitry couples to the display and the two-dimensional bar code reader including a switch for applying power to the two-dimensional bar code reader to cause it to read the two-dimensional bar code label, wherein the control circuitry executes the first commands following executing of a second command controlling the switch; and a computer which controls price information displayed by the electronic price labels and which sends a message to selected ones of the electronic price labels containing the second command so that the two-dimensional bar code readers of the selected ones of electronic price labels are selectively activated.

2. The electronic price label system of claim 1 wherein at least one of said electronic price labels further comprises a manual bar code reader.

3. The electronic price label system of claim 1 wherein said computer comprises:

an electronic price storage medium; and electronic price label software for maintaining an electronic price label data file, said electronic price data file including a line entry for each electronic price label.

4. The electronic price label system of claim 3 wherein said line entry includes an item identification entry identifying a store item associated with an electronic price label, an electronic price label identification entry for the electronic price label, and an electronic price label price checksum value entry.

5. The electronic price label of claim 1 wherein said first commands include a programming instruction to cause the display to display a promotional message.

6. The electronic price label system of claim 1 wherein said first commands include scheduling instructions for displaying a promotional message.

7. The electronic price label system of claim 1 wherein said first information includes an item's unit of measurement for a unit price calculation.

8. The electronic price label system of claim 1 wherein said first commands include a programming instruction to cause the display to display a product update message.

9. The electronic price label system of claim 1 wherein said commands include a command to perform internal diagnostic procedures.

10. The electronic price label system of claim 1 wherein said commands include a command to display all segments or a test pattern sequence in order to facilitate a visual check of the display.

11. The electronic price label system of claim 1 wherein said commands include a command to display internal factory and store assigned information stored within the electronic price label receiving the command.

12. A method of operating an electronic price label system having a plurality of electronic price labels, comprising the steps of:

applying an overlay having front and rear sides, wherein the rear side has a two-dimensional bar code label situated adjacent a two-dimensional bar code reader located on a front face of an electronic price label, wherein the two-dimensional bar code label includes first information identifying an item associated with the electronic price label and second information including first commands for controlling the electronic price label's display;

sending a message from a computer which controls price information displayed by the electronic price labels to the electronic price label containing the second command so that the two-dimensional bar code reader of the electronic price label is selectively activated;

reading the first and second information; and controllably driving the electronic price label's display.

* * * * *